Jan. 19, 1971 J. GUTIERREZ 3,556,620

DISPLAY CASE FOR TAPE CARTRIDGES

Filed March 28, 1969 3 Sheets-Sheet 1

INVENTOR.
JULIAN GUTIERREZ

BY Richard Gregory

ATTORNEYS

DISPLAY CASE FOR TAPE CARTRIDGES

Filed March 28, 1969 3 Sheets-Sheet 2

INVENTOR.
JULIAN GUTIERREZ
BY
Reifsnyder Gregory
ATTORNEYS

INVENTOR.
JULIAN GUTIERREZ
BY
Reif and Gregory
ATTORNEYS

United States Patent Office 3,556,620

Patented Jan. 19, 1971

3,556,620

DISPLAY CASE FOR TAPE CARTRIDGES

Julian Gutierrez, 6233 Brookview Ave. S., Minneapolis, Minn. 55424

Filed Mar. 28, 1969, Ser. No. 811,415

Int. Cl. A47f *3/08;* A47b *81/00*

U.S. Cl. 312—136 5 Claims

ABSTRACT OF THE DISCLOSURE

A showcase for the safe display and selection of recorded tape cartridges and cassettes comprising a housing substantially parallelepiped in form having a transparent upwardly swinging top cover, a plurality of inclined plate members pivotally upstanding within said housing, said plate members including pockets to receive said cartridges and cassettes, said plate members respectively having exteriorly extending handle portions for pivoting said plate members forwardly and rearwardly and relatively friction free means spacing said plate members for relatively easy movement of said plate members as a group.

BACKGROUND AND SUMMARY OF THE INVENTION

The invention herein has to do with the display of tape recordings. Tape recordings are popularly in use and are in the form of cartridges and smaller cassettes, each of which are easily carried in a pocket. A serious problem of theft by shoplifting is present in the display of said cartridges and cassettes. It is customary to use open and unattended display racks for the purpose of providing an adequate supply for selection. It is desirable in connection with such a display to provide adequate means to prevent theft.

It is desirable therefore to provide an enclosed display cabinet having a transparent upwardly swingable cover through which the cartridges and cassettes may be readily viewed and having therein upstanding pivotal or swingable plate members equipped with pockets for receiving said cartridges and cassettes and having exteriorly extending handles for selectively moving said plate members and for the release of said cover by authorized personnel for the withdrawal of selected of said cartridges and cassettes.

It is an object of this invention therefore to provide means for the same display of tape cartridges and cassettes and for the convenient withdrawal of the same from a secure display cabinet.

It is another object of this invention to provide a secure display cabinet arranged and constructed to permit a visual inspection of each article therein by the manipulation of an exterior arm without having direct physical access to said items therein.

It is also an object of this invention to provide a display cabinet which is of relatively simple construction and which has its contents secured but readily accessible to authorized personnel.

These and other objects and advantages of the invention will be set forth in the following description made in connection with the accompanying drawings in which like reference characters refer to similar parts throughout the several views and in which.

DESCRIPTION OF A PREFERRED EMBODIMENT

Figure 1:
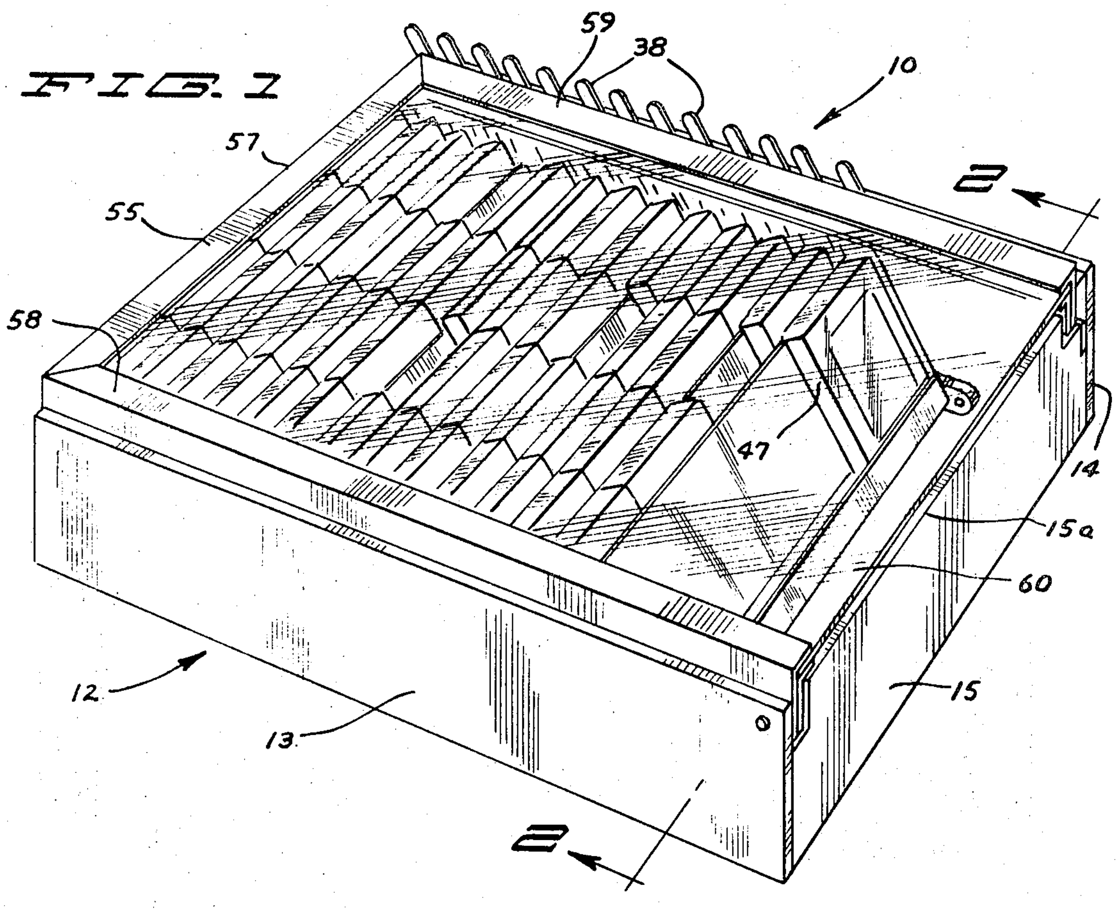
FIG. 1 is a top perspective view.

Referring to the drawings, the structure comprising a preferred embodiment of the invention herein is indicated generally by the reference character 10 and includes a housing 12 which is generally parallelepiped in form having side walls 13 and 14, a front end wall 15 and a rear end wall 16, a bottom wall 17 and a chamber 18 therein.

Secured to the inner side walls of said housing adjacent the bottom wall thereof are strip members 21 and 22 extending substantially the full length of said side walls and being suitably secured thereto as by the use of screws.

Extending inwardly of said strip members are a plurality of aligned opposed pairs of pins 24 and 25. Said strip members may very suitably be formed of a plastic material having said pins integral therewith.

Pivoted to opposed pairs of said pins are tape cartridge or cassette holding members 27 of identical construction of which one is described and is here shown formed of a plate member comprising a rear wall 28, a narrow bottom wall 29 and a relatively short upstanding front wall 30 forming a channel 31 with said rear wall to receive said cartridges or cassettes therein. Extending forwardly of upper portions of said rear wall are ear-like end walls 33 and 34 respectively carrying at their inner sides forwardly projecting disc-like rollers 35 and 36 journaled onto pins 37 respectively secured to said end walls. Said end wall 34 has an outwardly offset upwardly extending arm 38 which forms an operating handle.

Figure 2:
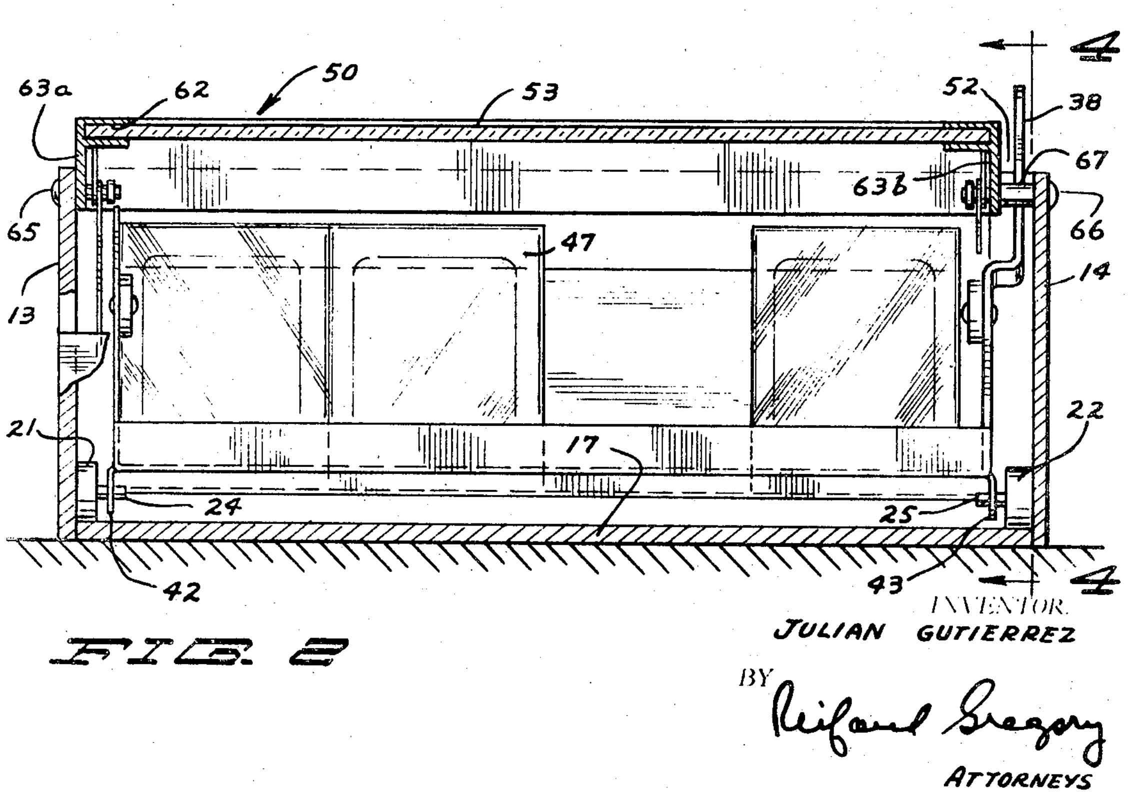
FIG. 2 is a view in vertical section taken on line 2—2 of FIG. 1 as indicated, with portions thereof being broken away.
Figure 3:
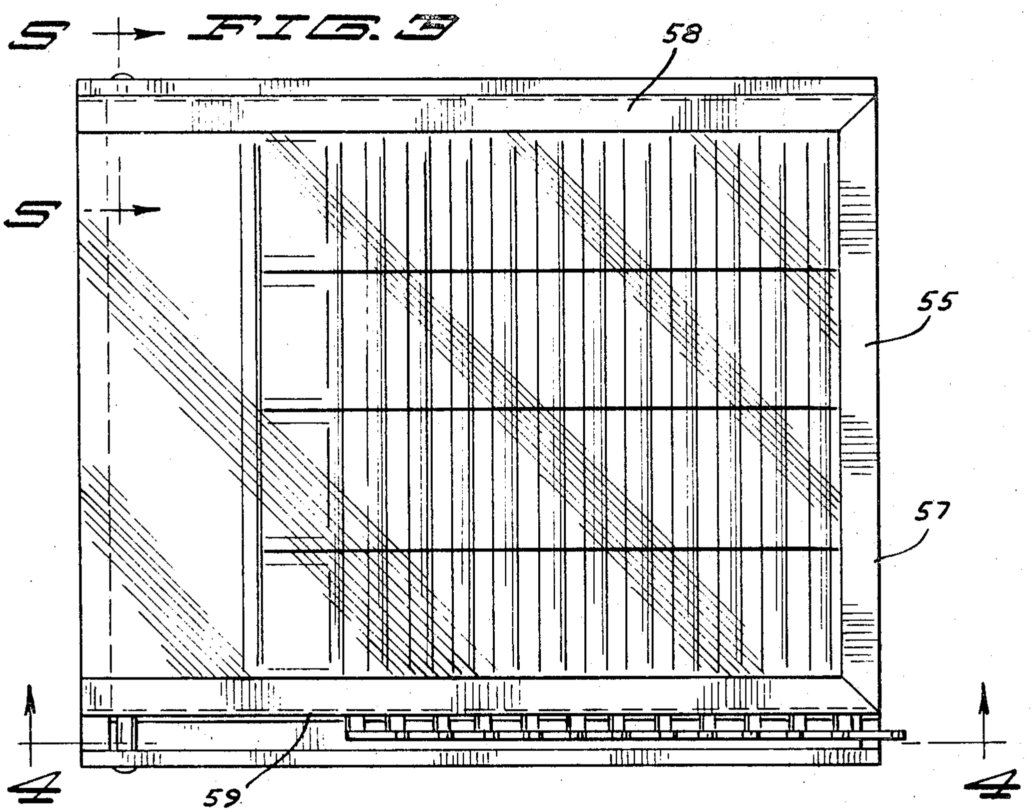
FIG. 3 is a top plan view.
Figure 4:
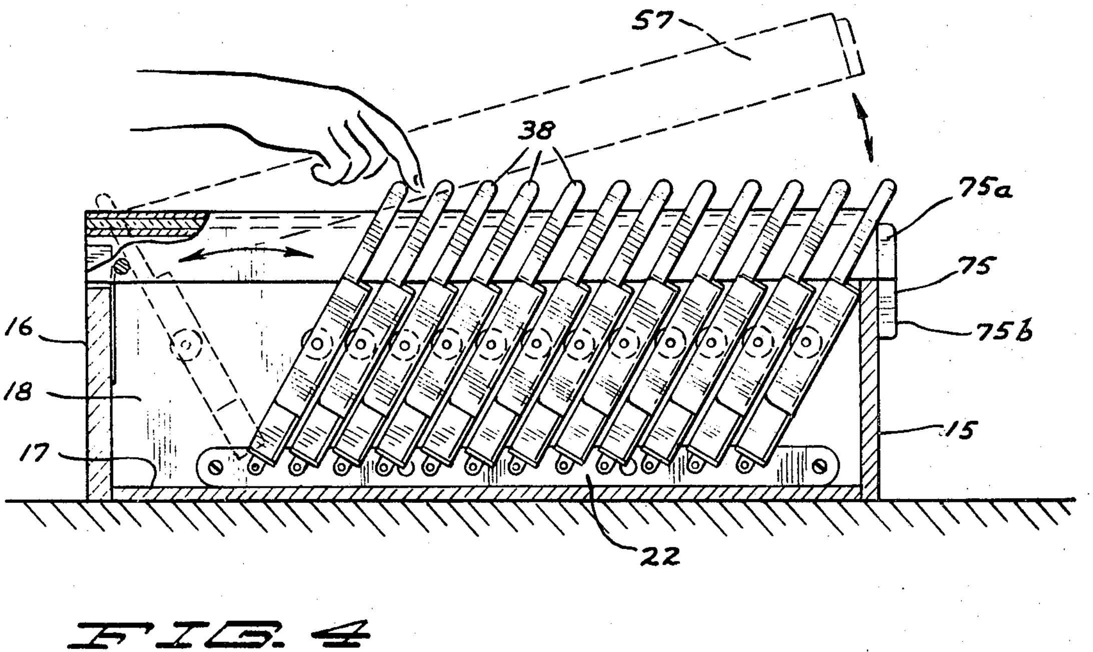
FIG. 4 is a view in vertical section taken on line 4—4 of FIG. 3 as indicated, with a portion thereof being broken away.
Figure 5:
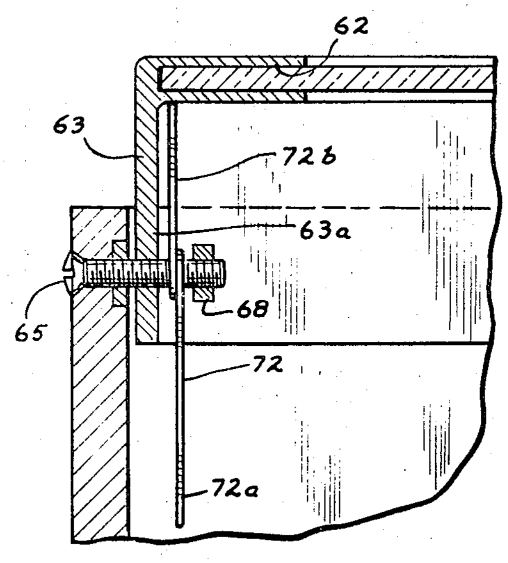
FIG. 5 is a broken view in vertical section on an enlarged scale taken on line 5—5 of FIG. 3 as indicated.
Figure 6:
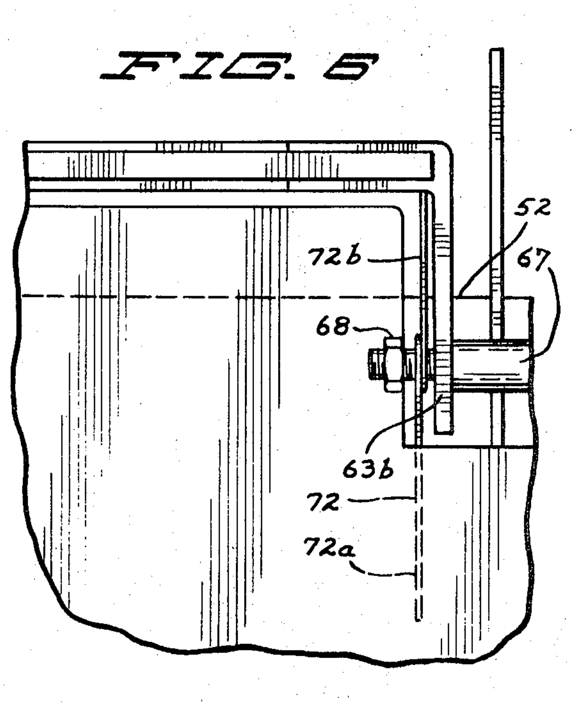
FIG. 6 is a broken view on an enlarged scale taken on line 6—6 of FIG. 1 as indicated.

Depending from said bottom wall at either end thereof are aligned leg portions 42 and 43 respectively having apertures 42*a* and 43*a* forming bearings into which are journaled opposed pairs of said pins 24 and 25 for pivotal support of said members 27. With said members 27 in operating position, as shown in FIGS. 1 and 2, said handles 38 of said members extend upwardly of said side wall 14 being adjacent the inner side thereof. Said members are shown holding tape cartridges or cassettes 47 as the case may be.

Overlying said housing 12 is a hinged cover 50 having a length coextensive with the length of said housing and having a width such as to be disposed between the side walls 13 and 14 of said housing and to be spaced inwardly of said side wall 14 sufficiently to provide a slot 52 therebetween for the upward projection of the handles 38.

Said cover comprises a transparent top or plate member 53 formed as of a suitable plastic sheet material which is shown here being edged by a rim 55 across its rear end portion 57 and side edge portions 58 and 59. Said rim comprises a horizontal channel 62 receiving therein the adjacent edge portions of said top member 53 and having a depending web portion 63 forming a relatively short depending wall across said end and along said sides of said top member 53.

Said front wall 15 extends somewhat above the height of said side walls 13 and 14 and is shown having an upper portion 15*a* of sufficiently reduced width to receive thereover and support the front end edge portion 60 of said cover, as shown in FIG. 1. Respectively extending transversely through the upper front end portions of said side walls 13 and 14 in opposed alignment with one another are hinge bolts 65 and 66 and the same extend through adjacent web portions 63*a* and 63*b* which are respectively apertured to receive said bolt hinges therethrough. Said bolt hinges have nuts 68 threaded onto the end portions thereof. The bolt 66 has a spacer bushing 67 thereover between said side wall 14 and said depending web 63.

Carried on said bolts and retained thereon by said nuts 68 are conventional torsion wire springs 72 each having one lower leg portion **72*a* bearing against the adjacent inner side of said end wall 15 and having their upper leg portions 72*b* bearing against the adjacent under side of said cover 50. The central circular eyelets 72*c* formed by the reverse curvature of said springs are disposed over the bolts 65 and 66. Said springs will be sufficient to raise and hold said cover in raised position when said cover is unlatched. It will be noted that said hinge bolts and said end wall 15*a*** support said cover to have its upper portion raised above the height of the side walls of said housing.

A latch member 75 of a conventional type will secure the rear end portion of said cover to said end wall 15 and said latch member is shown symbolically having cooperating parts **75*a* and 75*b*** respectively carried by said cover and said end wall.

MODIFICATION

Figures 7, 8:
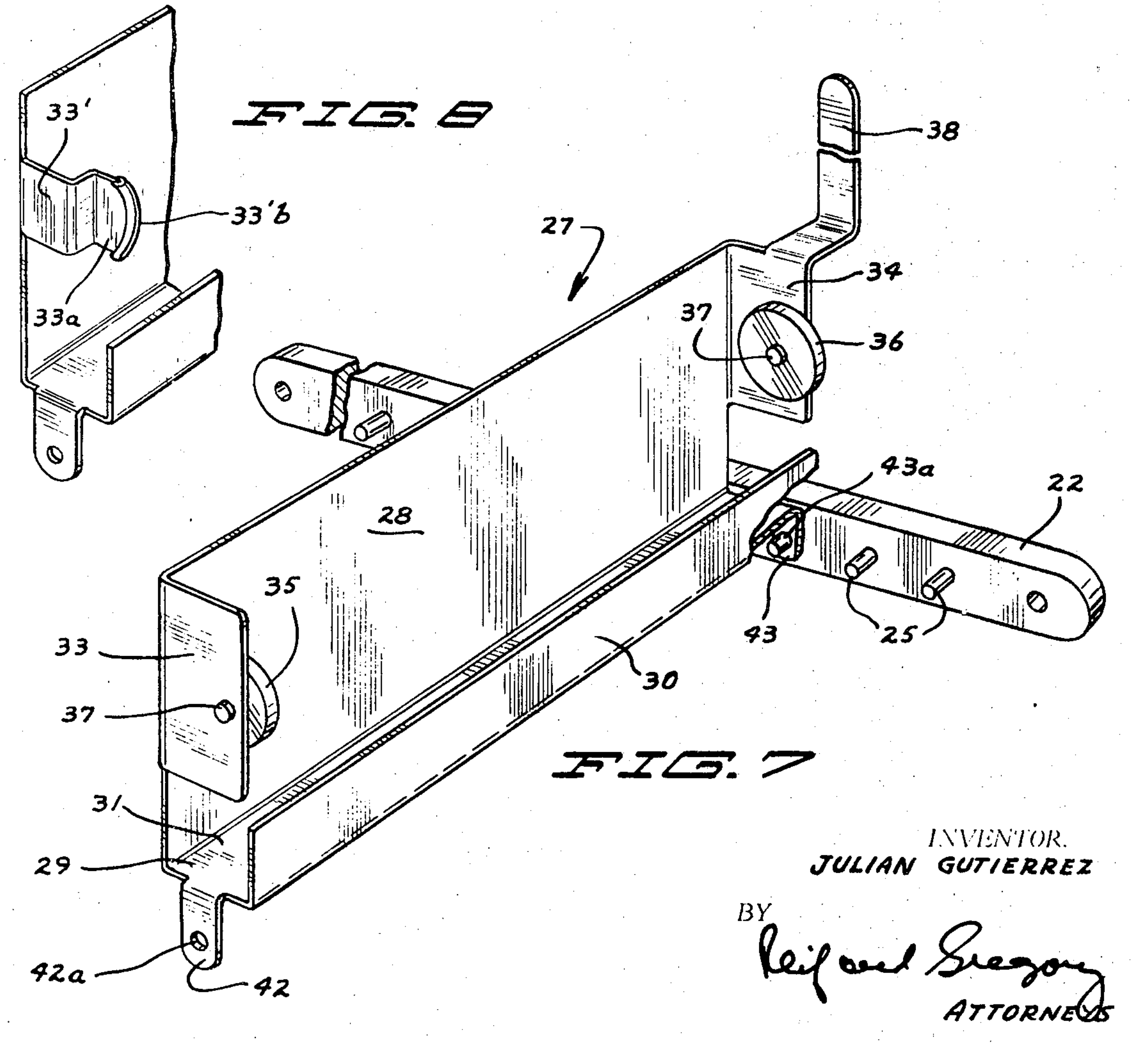
FIG. 7 is a detail of structure on an enlarged scale shown in perspective.
FIG. 8 is a broken view on an enlarged scale showing a modification of a detail.

With reference to FIG. 7 and the forwardly extending wall portions 33 and 34 of the member 27 which carry the bearing rollers 35, it will be understood that friction reducing spacers in substitution for and modification of said rollers between adjacent of the members 27 may otherwise be formed. A modification is shown in FIG. 8 wherein the portion 33′ as shown has reference to like modification of both the forward end wall portions 33 and 34. The wall 33′ has a forwardly projecting inwardly offset portion **33′*a* having an arcuate leading edge portion received into a relatively friction free overlay or runner 33′*b*** formed of material such as of nylon or Teflon having a small coefficient of friction.

OPERATION

The purpose of the device herein is to discourage the theft by shoplifting of tape recorded cartridges and cassettes. The members 27 will be loaded for display purposes with cartridges and cassettes. These will be clearly viewable through the transparent cover 50. Any interested party may quickly view the contents of all of the members 27 by tilting each one forwardly by operation of the handles 38 or a group of members 27 may be moved forwardly simultaneously very readily. The rollers 35 provide a minimum of friction between adjacent of the members 27 when they are moved in groups that only slight finger pressure is required. When the members 27 have all been tilted forwardly, they may very readily all be tilted back to their original position by movement of the handle 38 nearest the forward end of the housing.

When a cartridge and cassette has been selected, an authorized person will unlatch the cover 50 by operation of the latching device 75. The cover is opened from the rear of the housing and is automatically tilted upwardly by action of the springs 72. The desired cartridge or cassette, as the case may be, is removed and the cover is immediately latched.

Thus the structure shown and described herein readily lends itself to a full display of the articles contained therein and provides for ready, removal of the articles by authorized persons and thus prevents the loss of said articles by shoplifting.

What is claimed is:

1. A secured showcase arranged and constructed for the display of tape recorded cartridges and casettes having in combination,
- a housing substantially parallelpiped in form,
- a plurality of upstanding members within said housing to receive and display said cartridges and cassettes,
- means pivotally supporting said members in closely spaced relation,
- a transparent cover overlying said housing,
- said cover forming an elongated slot along one side of said housing,
- said members respectively having upwardly projecting handle portions extending through said slot,
- said cover being pivotally supported at one end of said housing, and
- latching means securing said cover to said housing at the other end thereof.

2. The structure set forth in claim 1,
- said members respectively having forwardly projecting wall portions disposed therebetween to hold said members in spaced relation with respect to one another, and
- said portions comprising substantially friction free spacing means.

3. The structure set forth in claim 1,
- said members having projecting portions for spacing said members with relation to one another, and
- said projecting portions respectively having journaled thereon forwardly projecting rotating members for engagement with adjacent of said members.

4. The structure set forth in claim 1,
- said means comprising a pair of elongated strips respectively adjacent the inner side walls of said housing,
- said strips respectively having opposed pairs of aligned projecting pins, and
- said members respectively having depending apertured portions to receive said pins, each of said members being supported by a pair of opposed aligned of said pins.

5. The structure set forth in claim 1,
each of said members comprising
- a back plate portion,
- a forwardly upturned portion of said back plate forming a channel therewith to receive said cartridges and cassettes,
- end walls projecting forwardly of said back plate,
- means in connection with said end walls spacing said members from one another, and
- means in connection with said back plate engaged by said pivotal supporting means.

References Cited

UNITED STATES PATENTS

| | | | |
|---|---|---|---|
| 933,851 | 9/1909 | Romshe | 312—136 |
| 1,329,539 | 2/1920 | Martin | 312—234 |
| 3,297,375 | 1/1967 | Reeves | 312—234X |

PATRICK D. LAWSON, Primary Examiner

U.S. Cl. X.R.

312—234